United States Patent [19]

Kamata

[11] Patent Number: 4,609,269
[45] Date of Patent: Sep. 2, 1986

[54] WIDE-ANGLE/TELEPHOTOGRAPHY CONVERTIBLE CAMERA WITH ELECTRONIC FLASH

[75] Inventor: Kazuo Kamata, Tokyo, Japan
[73] Assignee: Fuji Photo Film Co., Ltd., Kanagawa, Japan
[21] Appl. No.: 656,412
[22] Filed: Oct. 1, 1984
[30] Foreign Application Priority Data
   Oct. 3, 1983 [JP] Japan ............................ 58-152041[U]
[51] Int. Cl.[4] ............................................ G03B 15/03
[52] U.S. Cl. ........................... 354/149.11; 354/195.12; 354/149.1
[58] Field of Search ............. 354/145.1, 149.1, 149.11, 354/222, 195.12

[56] References Cited

U.S. PATENT DOCUMENTS

| | | | |
|---|---|---|---|
| 4,104,663 | 8/1978 | Yamazaki et al. | 354/195.12 |
| 4,119,983 | 10/1978 | Tanaka | 354/195.12 |
| 4,176,930 | 12/1979 | Imura | 354/195.12 |
| 4,482,228 | 11/1984 | Fujita | 354/195.12 |
| 4,515,453 | 5/1985 | Wakabayashi et al. | 354/149.1 |

FOREIGN PATENT DOCUMENTS 0050324 4/1979 Japan ............................ 354/149.11

*Primary Examiner*—Russell E. Adams
*Attorney, Agent, or Firm*—Young & Thompson

[57] ABSTRACT

A camera can be converted between use for wide-angle photography and telephotography, by inserting a conversion lens into or removing the conversion lens from the optical train. A changeover ring is rotatable between two positions to effect this conversion. A flash unit moves between two positions: a raised position in which the flash unit is directly exposed, for telephotography, and a lowered position in which the flash unit is disposed behind a light diffusing plate, for wide-angle photography. Movement of the changeover ring respectively frees the flash unit for upward movement, or lowers it. A spring-urged detent releasably retains the flash unit in lowered position.

15 Claims, 7 Drawing Figures

WIDE-ANGLE/TELEPHOTOGRAPHY CONVERTIBLE CAMERA WITH ELECTRONIC FLASH

BACKGROUND OF THE INVENTION

The present invention relates to a camera with a flash unit capable of popping up from the camera body and in which the distribution angle of the flash is made to vary with the changeover between wide-angle photography and telephotography.

A wide-angle/telephotographic convertible camera including a flash unit is widely known in the art, in which the distribution angle of the flash is made to vary with the changeover between wide-angle photography and telephotography. For example, in the disclosure of Japanese Utility Model Appln. No. 52-155543, an electronic flash is fixed on the front face of a camera body and a light-diffusing plate is slidably disposed on the front face. During standard photography, the light-diffusing plate moves in front of the electronic flash thereby to make the distribution angle of the flash wide; whilst during telephotography, the flash is emitted without passing through the light-diffusing plate.

In flash photography, there arises a problem called the pink eye phenomenon, in which human eyes are photographed colored red, as those of a rabbit. In order to avoid the pink eye phenomenon, it is necessary to space the electronic flash from the taking lens by an amount corresponding to a distance depending on the guide number of the electronic flash. Since the flash is not diffused for telephotography, the guide number for telephotography is larger than that for standard photography. Therefore, if the electronic flash is fixed to the camera body, then in order to avoid the pink eye phenomenon which is likely to occur during telephotography, it is necessary to position the electronic flash sufficiently far from the taking lens. Because of this, in a wide-angle/telephotography changeover camera with a light diffusing plate slidably mounted thereon, there arises the problem that the camera body as a whole becomes quite large.

Furthermore, in the device of Japanese Patent Appln. Laid-open Publ. No. 55-129321, a light-diffusing plate is disposed in front of the electronic flash to pop up from the camera body. During standard flash photography, in which the angle of view is large, the electronic flash and the light-diffusing plate pop up from the camera body; but during flash telephotography, only the electronic flash pops up. The wide-angle/telephotography changeover camera with an electronic flash of this type has a movable electronic flash so that it is possible to avoid the above-mentioned pink eye phenomenon. However, since both the electronic flash and the light-diffusing plate pop up, the construction is complicated, which makes it hard to utilize it in a compact camera.

OBJECTS OF THE INVENTION

It is therefore a principal object of the present invention to provide a camera which makes it possible to avoid the pink eye phenomenon during telephotography.

It is another object of the present invention to provide a compact camera of a simple construction.

It is a further object of the present invention to provide a camera which sets the position of the flash unit during the changeover between wide-angle photography and telephotography.

It is a still further object of the present invention to provide a camera in which the image magnification of the finder is varied by the changeover between wide-angle photography and telephotography.

SUMMARY OF THE INVENTION

In order to achieve the above objects, the present invention provides a light-diffusing plate mounted and exposed on a front face of a camera body and a flash unit disposed behind the light-diffusing plate. The flash unit is movable between a retracted position behind the light-diffusing plate, and a popped-up position above the light-diffusing plate. During wide-angle flash photography, the flash unit is located in the retracted position to make the distribution angle of flash wide; and during flash telephotography, the flash unit is moved to the popped-up position to radiate flash without passing through the light-diffusing plate.

According to the present invention, during wide-angle photography wherein the guide number is smaller due to the light-diffusing plate, the flash unit does not pop up because a sufficient distance for avoiding the pink eye phenomenon can be ensured. But during telephotography wherein the guide number is large, the flash unit pops up to maintain a preset distance from the taking lens so that the pink eye phenomenon does not occur. In addition, according to the present invention, since the light-diffusing plate does not move, and so the construction is simple and it is possible to make the camera compact.

BRIEF DESCRIPTION OF THE DRAWINGS

FIG. 6 shows in section the switch for the electronic flash in its OFF position; and.

DETAILED DESCRIPTION OF THE INVENTION

Figure 1:
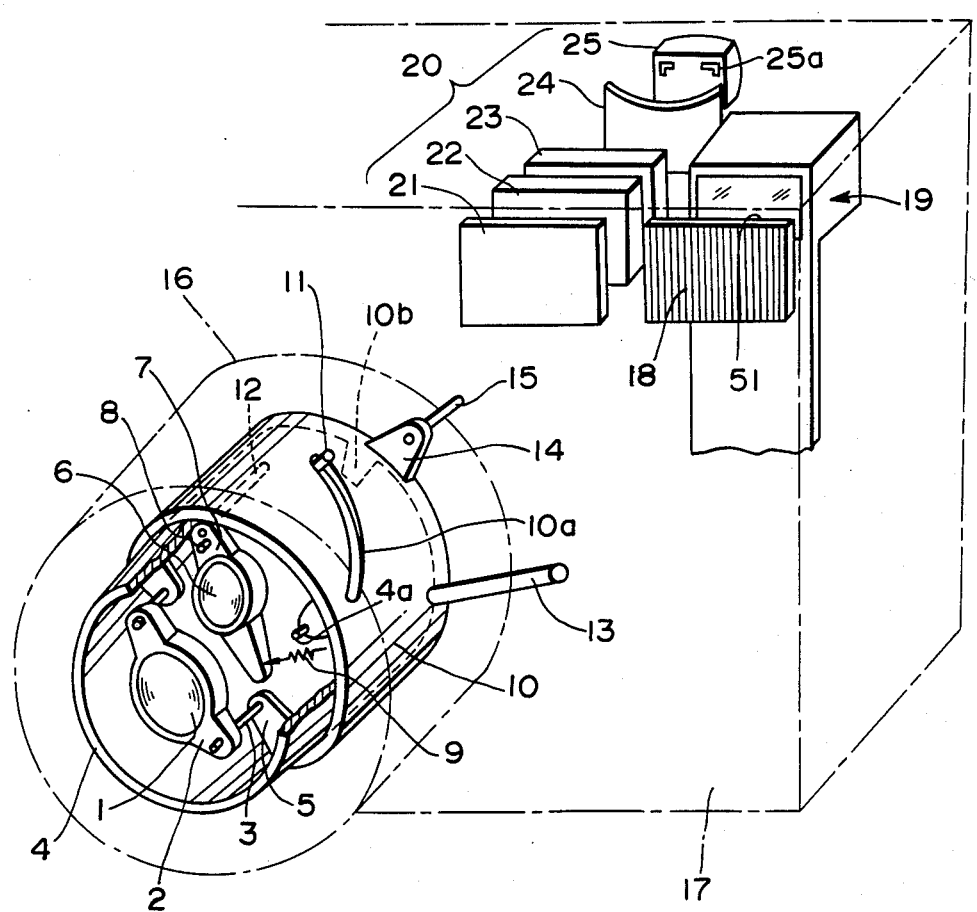
FIG. 1 is a fragmentary perspective view showing the parts positioned for wide-angle flash photography according to one embodiment of the present invention.
Figure 2:
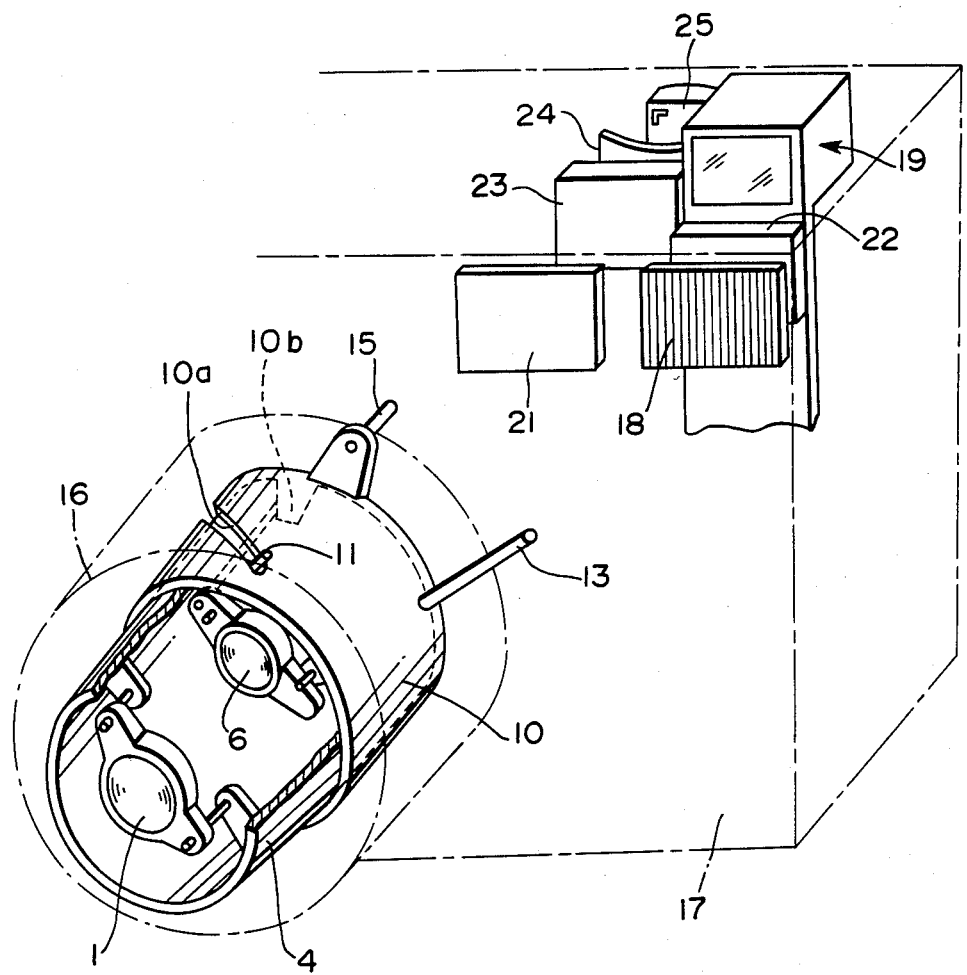
FIG. 2 is a view similar to FIG. 1 but showing the parts positioned for flash telephotography.

Referring to FIG. 1 wherein the parts are in their position for wide-angle flash photography and also to FIG. 2 wherein the parts are in their position for flash telephotography, a main lens 1 is mounted in a holder 2. The holder 2 is supported via shafts 3 by brackets 5 fixedly connected to a lens barrel 4. A teleconversion lens 6 is supported by a holder 7 which is pivotally supported by a shaft 8. The teleconversion lens 6 is urged by a compression spring 9 toward the wide-angle position (FIG. 1) wherein it is retracted from the optical axis of the main lens 1. A wide-angle/telephotography changeover ring 10 is rotatably engaged about the lens barrel 4. A cam slot 10a formed on the periphery of the ring 10 receives a pin 11 mounted on the outer periphery of the lens barrel 4.

As the wide-angle/telephotography changeover ring 10 rotates counterclockwise, a protrusion 10b on the inside of the ring 10 pushes a pin 12 so that the holder 7 is made to swing counterclockwise against the force of spring 9, to the FIG. 2 position. When the holder 7 reaches the position wherein the optical axis of the teleconversion lens 6 coincides with the optical axis of the main lens 1, then the holder 7 abuts against a fixed pin 4a and stops in that position.

A pin 13 and a bracket 14 are fixedly connected to the rear end of the wide-angle/telephotography changeover ring 10, the pin 13 protruding radially outwardly of the ring 10. The pin 13 restricts the popping up of the flash unit, as will be described later. The bracket 14 is provided with a pin 15 extending parallel to the optical axis of the main lens 1, the pin 15 varying the focal length of a finder as will be described later.

An outer barrel 16 carried by camera body 17 mounts the above-mentioned lens parts. A light-diffusing plate 18 is mounted on the upper front face of camera body 17.

Behind the light-diffusing plate 18, a flash unit 19 is mounted so as to pop up from the camera body 17. The flash unit 19 is disposed behind the light-diffusing plate 18 when the teleconversion lens is retracted from the optical axis of the main lens in order to prepare for wide-angle photography. The flash unit 19 is located remote from the light-diffusing plate 18 when the teleconversion lens 6 is inserted along the optical axis of the main lens 1 to prepare for telephotography, thereby enabling the popping up of the unit 19 from the camera body 17.

Figure 3:
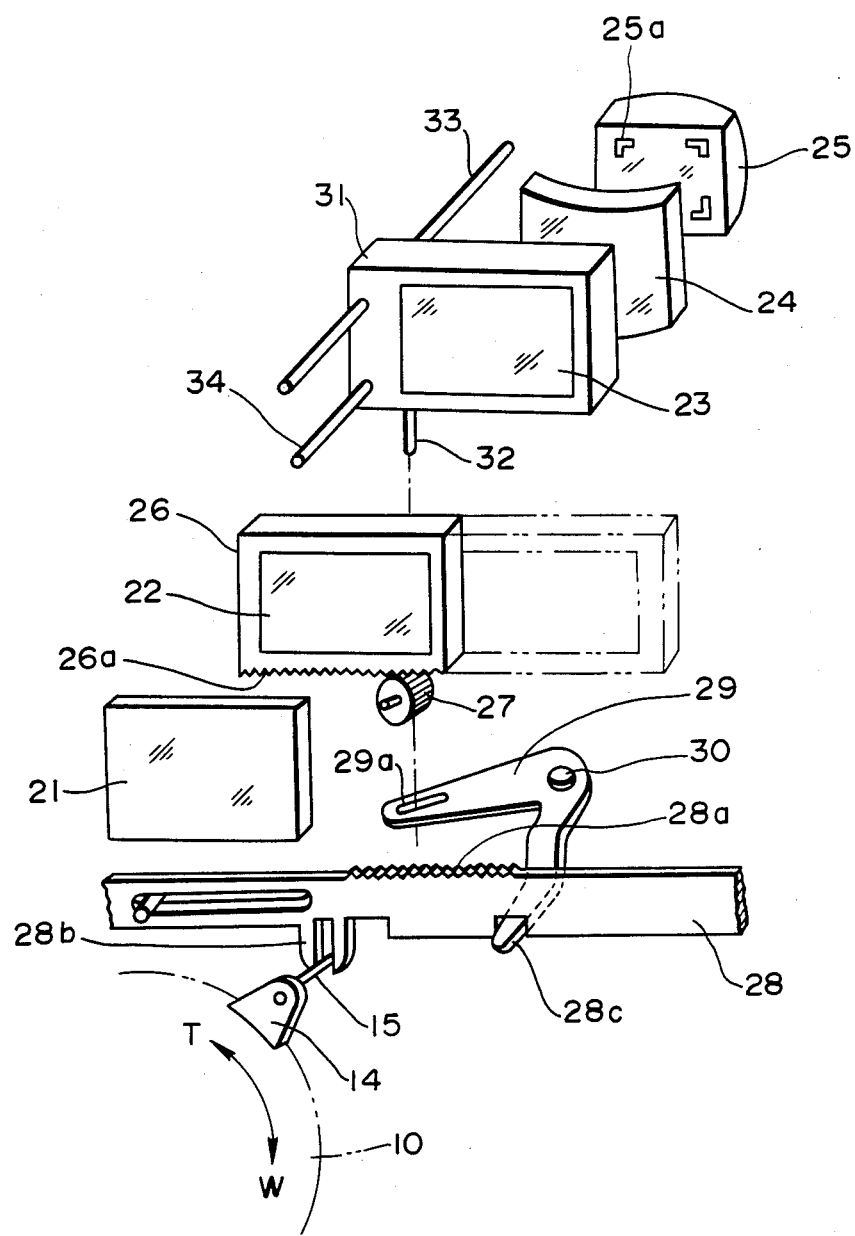
FIG. 3 is an exploded perspective view showing the construction of the zoom finder.

As shown in detail in FIG. 3, a finder 20 comprises a transparent glass 21 fixedly attached to the front face of the camera body 17, a first objective lens 22, a second objective lens 23, a half mirror 24, and an eyepiece 25. A holder 26 for the first objective lens 22 is formed with a gear 26a meshing with a pinion gear 27. The pinion gear 27 meshing with a rack 28a of a slide lever 28 transmits the linear motion of the slide lever 28 to the holder 26 to move the latter back and forth between the full- and phantom-line positions shown in FIG. 3. The slide lever 28 is coupled to the pin 15 through a yoke 28b, and moves linearly upon rotation of the wide-angle/telephotography changeover ring 10. A notched portion 28c of the slide lever 28 receives one end of a bell crank lever 29. The bell crank lever 29 is pivotally supported by a shaft 30, and an elongated aperture 29a formed on the other end thereof receives a pin 32 mounted on holder 31 of the second objective lens 23. By virtue of the bell crank lever 29 and the pin 32, upon rotation of the wide-angle/telephotography changeover ring 10, the second objective lens 23 moves along the optical axis guided by guide shafts 33 and 34. The half mirror 24 is for superposing an image of an object to be photographed and an image of a viewer frame 25a provided on the inner face of the eyepiece 25.

Figure 4:
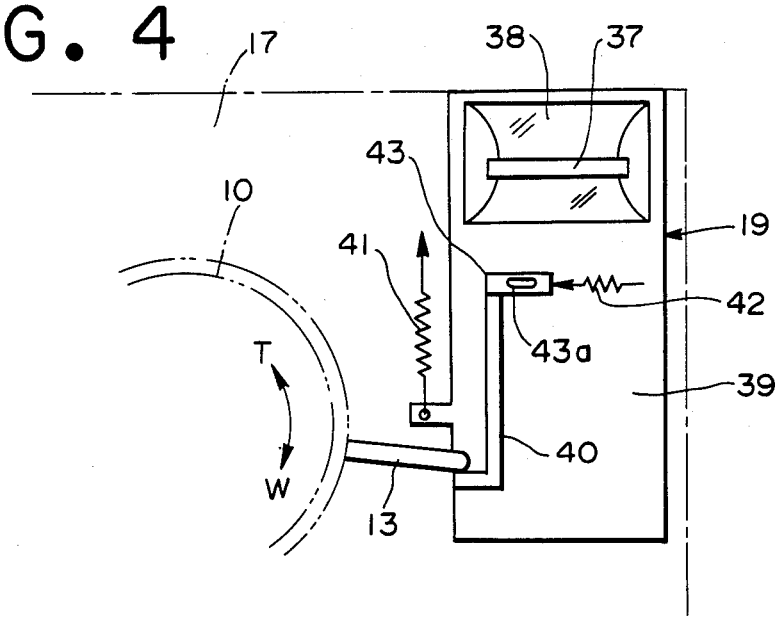
FIG. 4 is a fragmentary view showing the pop-up mechanism of the flash unit, with the flash unit in retracted position.
Figure 5:
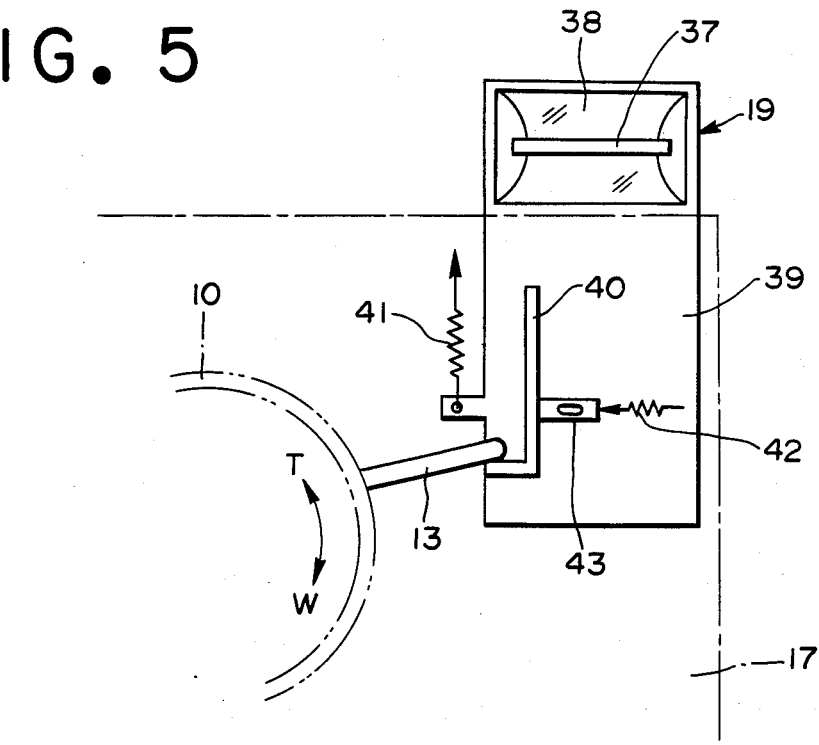
FIG. 5 is a view similar to FIG. 4 but showing the flash unit popped up.

As shown in FIGS. 4 and 5, the flash unit 19 comprises, as is well known in the art, a flash discharge tube 37, a reflector 38 for reflecting the flash emitted in a forward direction from the flash discharge tube 38, and an apron 39. The reflector 38 has a configuration such that the distribution angle is appropriate to telephotography when the teleconversion lens 6 lies on the optical axis of the main lens 1. But when the light-diffusing plate 18 is positioned in front of the flash unit 19, the distribution angle is appropriate for wide-angle photography wherein the teleconversion lens 6 is retracted from the optical axis of the main lens 1. An elongated protrusion 40 of L-shape is formed on the apron 39; and during wide-angle photography, the flash unit 19 is held at the lowered position by the elongated protrusion 40 and the pin 13, as seen in FIG. 4. For telephotography, the pin 13 rotates counterclockwise, and the flash unit 19 pops up under the influence of spring 41, to the FIG. 5 position. Thus, when a detent 43 is moved to the right against the force of a spring 42, the flash unit 19 is freed to pop up.

Figure 6:
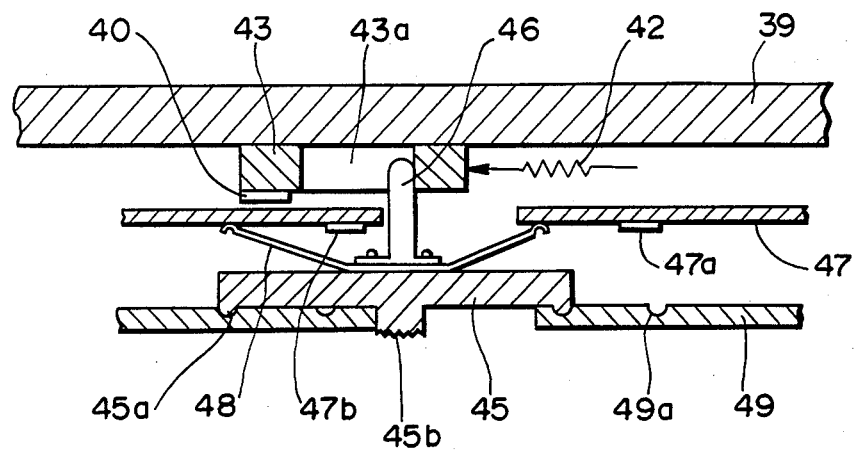
Figure 7:
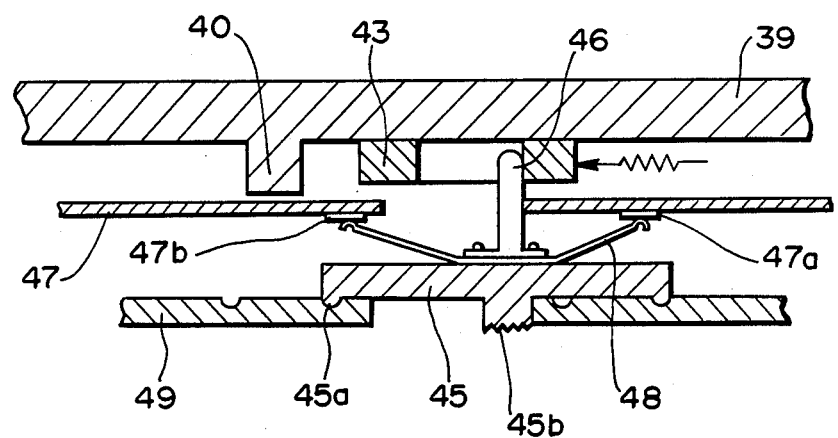
FIG. 7 is a view similar to FIG. 6 but in the ON position.

FIGS. 6 and 7 show an arrangement of a switch for the flash unit. On the back face of a slide 45, a pin 46 and spring brushes 48 are fixedly secured. The pin 46 is disposed in an elongated aperture 43a of the detent 43. The brushes 48 electrically connect contacts 47a and 47b of a circuit board 47. Two projections 45a are formed in order to hold the lever 45 either at an ON position (FIG. 7) or an OFF position (FIG. 6). The two projections 45a mate with either one of two sets of click grooves 49a formed on a front plate 49, with the help of the resilient force of the brushes 48. The lever 45 is provided with a button 45b accessible from the outside of the camera so that the ON/OFF of the electronic flash device can be manually set. In the case of low ambient light, the automatically flashing electronic flash device is used, and an electromagnetic device such as a solenoid is actuated to move the detent 43, thereby permitting the flash unit to pop up. In this case, it is convenient if a manual switch for deliberately stopping the flash unit is provided.

The operation of the above embodiment will now be described. For wide-angle photography, as shown in FIG. 1, the wide-angle/telephotography changeover ring 10 remains in the left-handmost, that is, the clockwise-rotated position, and the pin 11 is at the left end of the cam slot 10a. During this wide-angle photography, since the teleconversion lens 6 is retracted from the optical axis of the main lens 1, light rays passing through only the main lens 1 impinge on the film.

If wide-angle photography is performed using the electronic flash device, the slide 45 is moved from the position shown in FIG. 6 to the position shown in FIG. 7. As the slide 45 moves toward the right, the brushes 48 contact the contacts 47a and 47b to turn a known flash control circuit ON. At the same time, the slide 43 is moved by pin 46 to the right of FIG. 4 and frees the upper end of the elongated protrusion 40. The flash unit 19 then pops up, under the influence of spring 41. However, during wide-angle flash photography, the pin 13 of the wide-angle/telephotography changeover ring 10 pushes down the lower end of the elongated protrusion 40, so that the flash unit 19 cannot pop up from the camera body. In this position, the flash unit 19 is positioned behind the light-diffusing plate 18. Thus, when the flash discharge tube 37 of the flash unit 19 flashes in synchronization with the shutter operation, the distribution angle of flash is wide, almost corresponding to the angle of view of the main lens 1. In this wide-angle photography, due to the low guide number, it is possible to space the flash unit 19 apart from the main lens 1 by a distance sufficient to avoid the pink eye phenomenon even if the flash unit 19 does not pop up from the camera body.

For telephotography, as shown in FIG. 2, the wide-angle/telephotography changeover ring 10 is rotated counterclockwise. Upon rotation of the wide-angle/-telephotography changeover ring 10, the engagement of the cam slot 10a with the pin 11 makes the main lens 1 move forward and the protrusion 10b pushes the pin 12 counterclockwise as seen in FIG. 2. Thus, the holder 7 holding the teleconversion lens 6 swings about the shaft 8 counterclockwise so that the teleconversion lens 6 is inserted in the optical train behind the main lens 1. Thus, during telephotography, light rays pass through the main lens 1 and the teleconversion lens 6 and impinge on the film.

When the wide-angle/telephotography changeover ring 10 is rotated counterclockwise, the slide lever 28 is moved to the left in FIG. 3 by means of the pin 15. Therefore, the first objective lens 22 of the finder 20 moves to the right, retreating from the optical path of the zoom finder and moving into a space 51 (FIG. 1) between the light-diffusing plate 18 and the flash unit 19. In addition, since the bell crank lever 29 rotates about the shaft 30 clockwise, the second objective lens 23 of the finder 20 retreats, thereby adjusting the field of vision of the finder 20 so as to match the angle of view at the time of telephotography.

If flash telephotography is to be performed, the lever 45 is moved to the position shown in FIG. 7 as previously described. During this flash telephotography, since the pin 13 is moved to the position shown in FIG. 5, when the detent 43 withdraws from the upper end of the elongated protrusion 40 upon movement of slide 45, the flash unit 19 is moved upward by the spring 41 thereby to pop up from the camera body 17. In this case, flash emitted from the flash unit 19 radiates directly upon the object to be photographed without passing through the light-diffusing plate 18. During such flash telephotography, since the guide number is large, the pink eye phenomenon is likely to occur. However, the flash unit 19 pops up away from and is thereafter located at a position remote from the main lens 1, so that the pink eye phenomenon is prevented.

In the case of telephotography without using the electronic flash device, the flash unit 19 is held in the pop-up position, and the slide 45 is moved to the left in FIG. 7. In this position, the detent 43 abuts against the elongated protrusion 40 of the apron 39. However, since the slide 45 can move within the elongated aperture 43a of the detent 43, the brushes 48 return to an OFF position, spaced from the contacts 47a and 47b, so that the emission of a flash is prevented. Furthermore, if the flash unit 19 is pushed into the lowered position as shown in FIG. 1, from the raised position, the detent 43, energized by the spring 42, moves over the upper end of the elongated protrusion 40 of the apron 39, so that the flash unit 19 is locked in the lowered position.

In the present specification, the invention has been described in connection with wide-angle/telephotography; however, these terms are somewhat relative, and any other combinations such as wide-angle/standard photography, standard/telephotography may also be adopted. Furthermore, the present invention can be applied to any of a variety of types of cameras: a type in which wide-angle photography and a telephotography can be selectively performed by inserting a conversion lens behind a main lens, and another type in which a wide-angle lens and a telephoto lens are juxtaposed, and a light ray passing through a desired one of the lenses falls on a film by turning over a mirror disposed at the back of the lenses.

It should also be understood that the foregoing relates to only a preferred embodiment of the invention, and that it is intended that the claims cover all changes and modifications of the example of the invention herein chosen for the purposes of the disclosure, which do not constitute departures from the spirit and scope of the invention.

What is claimed is:

1. A camera selectively usable either for wide-angle photography or for telephotography, by changing the focal length of a taking lens system by manipulation of a changeover member, the camera having a flash unit mounted for movement on the camera between a first lowered position and a second raised position, a fixed light diffusing plate behind which said flash unit is dispoded in said first position, means actuated by movement of said changeover member is a direction to convert the camera for wide-angle photography, to move said flash unit to said first position, means responsive to movement of said changeover member in a direction to convert the camera to telephotography, to free said flash unit for movement toward said second position, means to energize said flash unit in each of said positions, and spring means urging said flash unit toward said second position.

2. A camera as claimed in claim 1, and a slide switch for controlling the operation of said flash unit, and a detent for selectively preventing said flash unit form moving from said first to said second position, said slide switch controlling the position of said detent such that when said slide switch turns the flash unit OFF, and the flash unit is in said first position, said detent prevents movement of said flash unit to said second position, and when said slide switch is ON, said detent is withdrawn and said flash unit can move to said second position under the influence of said spring means.

3. A camera as claimed in claim 2, said slide switch having a slide having a protrusion thereon that contacts said detent to move said detent in a direction to free said flash unit for movement to said second position, and spring means urging the detent into a position to prevent movement of the flash unit to said second position.

4. A camera as claimed in claim 3, said detent having an aperture therein elongated in the direction of movement of the detent, said protrusion engaging in said aperture whereby said slide switch can be moved independently of said detent.

5. A camera as claimed in claim 1, said means to move said flash unit to said first position including a projection carried by said changeover member that contacts said flash unit to depress said flash unit to said first position against the action of said spring means.

6. A camera as claimed in claim 1, said lens system including a conversion lens which adapts the camera to telephotography when inserted in the optical train of said lens system and for wide-angle photography when removed from said optical train, said changeover member having means thereon contacting said conversion lens to move said conversion lens with said changeover member between said two positions of said changeover lens.

7. A camera as claimed in claim 6, and a lens barrel holding a main lens of said lens system and mounted for movement along the optical axis of said main lens, and a lens holder holding said conversion lens and mounted for movement on said barrel in a direction perpendicular to the optical axis of said main lens.

8. A camera as claimed in claim 7, in which said changeover member is a ring rotatably mounted on and surrounding said lens barrel.

9. A camera as claimed in claim 8, and a pin and slot connection between said changeover ring and said lens barrel whereby said lens barrel is displaced axially within said changeover ring upon relative rotation of said barrel and ring.

10. A camera as claimed in claim 9, said changeover ring and conversion lens holder having a pin and projection connection by which said conversion lens holder is moved relative to the optical axis of said main lens upon rotation of said ring and barrel relative to each other.

11. A camera selectively usable either for wide-angle photography or for telephotography, by changing the focal length of a taking lens system by manipulation of a changeover member, the camera having a flash unit mounted for movement on the camera between a first lowered position and a second raised position, a light diffusing plate behind which said flash unit is disposed in said first position, means actuated by movement of said changeover member in a direction to convert the camera for wide-angle photography, to move said flash unit to said first position, means responsive to movement of said changeover member in a direction to convert the camera to telephotography, to free said flash unit for movement toward said second position, said lens system including a conversion lens which adapts the camera to telephotography when inserted in the optical train of said lens system and for wide-angle photography when removed from said optical train, said changeover member having means thereon contacting said conversion lens to move said conversion lens with said chageover member between said two positions of said changeover members, a lens barrel holding a main lens of said lens system and mounted for movement along the optical axis of said main lens, and a lens holder holding said conversion lens and mounted for movement of said barrel in a direction perpendicular to the optical axis of said main lens, said changeover member being a ring rotatably mounted on and surrounding said lens barrel.

12. A camera selectively usable either for wide-angle photography or for telephotography, by changing the focal length of a taking lens system by manipulation of a changeover member, the camera having a flash unit mounted for movement on the camera between a first lowered position and a second raised position, a light diffusing plate behind which said flash unit is disposed in said first position, means actuated by movement of said changeover member in a direction to convert the camera for wide-angle photography, to move said flash unit to said first position, means responsive to movement of said changeover member in a direction to convert the camera to telephotography, to free said flash unit for movement toward said second position, and a finder comprising a first objective lens, a second objective lens and an eyepiece, said first objective lens being adapted to move between a first position where said first objective lens is aligned with said eyepiece and a second position where said first objective lens is placed in a space formed between said flash device and light diffusing plate, so as to change the magnification of said finder.

13. A camera as claimed in claim 12, said means for moving said first objective lens comprising a slide lever with a rack thereon and means interconnecting said changeover member and said slide lever to move the slide lever lengthwise of the rack in opposite directions, a pinion engaging with said rack, and a further rack on said first objective lens.

14. A camera as claimed in claim 12, said means for moving said second objective lens comprising a slide lever, means interconnecting said slide lever and said changeover member to cause said slide lever to slide lengthwise, a bell crank lever having one arm connected to said slide lever for swinging movement of the bell crank lever upon longitudinal movement of the slide lever, the bell crank having a second arm interconnected with said second objective lens of the finder to move said second objective lens toward and away from the eyepiece.

15. A camera as claimed in claim 12, the finder comprising also a second objective lens, means responsive to movement of said changeover member in a direction to convert the camera for telephotography, to move said first objective lens to said second position from said first position and to move said second objective lens closer to said eyepiece, and means responsive to movement of said changeover member in a direction to convert the camera for wide angle photography, to move said first objective lens to said first position from said second position and to move said second objective lens farther away from said eyepiece.

* * * * *